2,840,595

LOWER-ALKYL ESTERS OF ETHIONINE

Donna Stevens, Concord, Calif., assignor to The Dow Chemical Company, Midland, Mich., a corporation of Delaware No Drawing. Application January 23, 1956
Serial No. 560,895

6 Claims. (Cl. 260—481)

This invention is concerned with the lower-alkyl esters of ethionine and the hydrogen chloride addition salts of such compounds. The esters of the present invention are characterized by the following formula

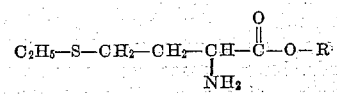

wherein R represents a lower-alkyl radical. The term "lower-alkyl" refers to the alkyl radicals containing from one to six carbon atoms, inclusive. These ester compounds are viscous liquids which are somewhat soluble in many organic solvents and of low solubility in water. The hydrogen chloride addition salts are waxy solids or viscous liquids which are readily soluble in many common organic solvents and water. The new compounds are useful as active toxic constituents of compositions for the control of the growth of plants.

The new hydrochloride salts of the lower-alkyl esters of ethionine may be prepared by reacting a lower-alkanol with the hydrogen chloride salt of ethionine of the formula

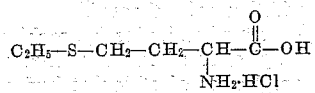

The reaction is carried out in the presence of hydrogen chloride as an esterification catalyst and takes place smoothly at temperatures of from 45° to 160° C. Conveniently the reaction may be carried out at the boiling temperature of the reaction mixture. Good results are obtained when employing substantially equimolecular proportions of the lower-alkanol and ethionine salt and a small amount of the catalyst. The employment of an excess of the lower-alkanol constitutes a preferred method of operation and gives increased yields of the desired product. Following the reaction, the reaction mixture is fractionally distilled under reduced pressure to separate catalyst and excess alkanol and obtain the desired ethionine ester hydrochloride as a residue.

In a convenient mode of operation, the ethionine hydrochloride salt is formed in situ in the reaction mixture from ethionine and hydrogen chloride. When operating in accordance with such method, ethionine and the lower-alkanol are mixed together and hydrogen chloride bubbled into and through the mixture at a temperature of from 45° to 160° C. During the addition the formed ethionate hydrochloride reacts with the lower-alkanol to produce the desired ester hydrochloride. Upon completion of the reaction, the product is separated as previously described.

The lower-alkanol esters of ethionine may be prepared by neutralizing or making somewhat alkaline an aqueous solution of the hydrochloride of the ethionine ester. The neutralization conveniently is carried out with ammonium hydroxide. During the neutralization, the ester of ethionine separates as an oily liquid. This product may be separated by decantation or extraction with a suitable solvent and thereafter purified by fractional distillation under reduced pressure.

The following examples illustrate the invention but are not to be construed as limiting.

EXAMPLE 1

*Methyl ester of ethionine hydrochloride*

Gaseous hydrogen chloride was bubbled over a period of one hour into and through 35 grams (0.21 mole) of ethionine dispersed in 500 milliliters of methanol. At the beginning of the addition of hydrogen chloride the temperature rose to the boiling point of the reaction mixture where it remained throughout the remainder of the addition. Following the addition, the reaction mixture was fractionally distilled under reduced pressure to separate excess methanol and hydrogen chloride catalyst and obtain a methyl ethionate hydrochloride product as a waxy solid residue. This residue was crystallized from a mixture of equal parts of ethyl acetate and diethyl ether and was found to melt at 72°–80° C. and have a chlorine content of 16.8 percent as compared to a theoretical content of 16.6 percent.

EXAMPLE 2

*Methyl ester of ethionine*

A portion of the methyl ethionate hydrochloride (19.7 grams, 0.092 mole) as prepared in Example 1 was dissolved in water, and the aqueous solution cooled and thereafter brought to a pH of from 9 to 10 with aqueous ammonia. Following the addition of the ammonia, the reaction mixture was extracted with diethyl ether and the extract fractionally distilled under reduced pressure to obtain a methyl ethionate product as a viscous liquid boiling at 97°–98° C. at three millimeters pressure.

EXAMPLE 3

*Ethyl ester of ethionine hydrochloride*

Gaseous hydrogen chloride was bubbled into and through 50 grams (0.31 mole) of ethionine dispersed in 500 milliliters of ethyl alcohol. The hydrogen chloride was added over a period of two hours and at a temperature of from 60° to 70° C. Following the addition, the reaction mixture was fractionally distilled under reduced pressure to separate excess alcohol and hydrogen chloride catalyst and obtain an ethyl ethionate hydrochloride product as a waxy solid residue. The residue was recrystallized from a 50–50 mixture of isopropanol and diethyl ether and found to melt at 76°–79° C.

EXAMPLE 4

*Normal propyl ester of ethionine hydrochloride*

Gaseous hydrogen chloride was bubbled into and through 27 grams (0.166 mole) of ethionine dispersed in 500 milliliters of normal propyl alcohol. The hydrogen chloride was added over a period of two hours and at a temperature of from 60° to 70° C. Following the addition, the reaction mixture was processed as described in Example 1 to obtain a normal propyl ethionate hydrochloride product as a waxy solid melting at 64°–67.5° C. and having a chlorine content of 14.8 percent as compared to a theoretical content of 14.7 percent.

EXAMPLE 5

*Isopropyl ester of ethionine hydrochloride*

Ethionine (27 grams, 0.166 mole) was dispersed in 250 milliliters (3.1 moles) of isopropyl alcohol and the resulting mixture saturated with anhydrous hydrogen chloride to prepare a mixture containing the hydrochloride salt of ethionine, isopropyl alcohol and hydrogen chloride catalyst. This mixture was then heated on a steam bath at the boiling temperature of the reaction mixture and for a period of one hour. The reaction mixture was then placed under reduced pressure and fractionally distilled to separate hydrogen chloride catalyst and unreacted alcohol and obtain the isopropyl ester of ethionine hydrochloride as a waxy solid residue. This product was crystallized from a mixture of isopropyl alcohol and ether and dried. The dried product melted at 123°–125° C. and had a chlorine content of 14.9 percent as compared with a theoretical content of 14.7 percent.

EXAMPLE 6

Secondary butyl ester of ethionine hydrochloride

Gaseous hydrogen chloride was bubbled into and through 35 grams (0.21 mole) of ethionine dispersed in 500 milliliters of secondary butyl alcohol. The hydrogen chloride was added over a period of two hours and at a temperature of from 60° to 70° C. The reaction mixture was then processed as described in Example 1 to obtain a secondary butyl ethionate hydrochloride product as a waxy solid melting at 106°–110° C. and having a chlorine content of 13.61 as compared to a theoretical content of 13.9 percent.

EXAMPLE 7

In a similar manner normal butyl alcohol was reacted with ethionine hydrochloride to obtain a n-butyl ethionate hydrochloride product as a waxy solid. This product melted at 64°–67.5° C. and had a chlorine content of 13.82.

EXAMPLE 8

Normal amyl ester of ethionine hydrochloride

Ethionine (35 grams, 0.214 mole) was dispersed in 300 milliliters of normal amyl alcohol and the resulting mixture saturated with anhydrous hydrogen chloride to prepare a mixture containing ethionine hydrochloride, amyl alcohol and hydrogen chloride catalyst. This mixture was heated at 80° C. for a period of about two hours. The reaction mixture was then fractionally distilled under reduced pressure to separate catalyst and excess amyl alcohol and obtain the normal amyl ester of ethionine hydrochloride as a white waxy solid residue. This product was crystallized from a mixture of ethyl acetate and diethyl ether and dried. The dried product had a chlorine content of 13.3 percent and a sulfur content of 11.78 percent as compared to theoretical contents of 13.2 and 11.9 percent, respectively.

EXAMPLE 9

Ethionine (23 grams, 0.14 mole) was dispersed in 250 milliliters of normal hexyl alcohol and the resulting mixture saturated with anhydrous hydrogen chloride to prepare a mixture containing ethionine hydrochloride, n-hexyl alcohol and hydrogen chloride catalyst. This mixture was heated on a steam bath for a period of two hours. The reaction mixture was then fractionally distilled under reduced pressure to obtain a n-hexyl ethionate hydrochloride product as a viscous liquid. This product was dissolved in 50 milliliters of water and the aqueous solution diluted with 125 milliliters of water. This mixture was then cooled and made slightly basic by the addition of dilute aqueous ammonia. The resultant mixture consisted of two layers, an aqueous layer and an organic layer. The latter was separated by decantation and fractionally distilled under reduced pressure to obtain a normal hexyl ethionate product as a viscous liquid having a nitrogen content of 5.70 percent as compared to a theoretical content of 5.67 percent.

The lower-alkyl esters of ethionine and their hydrochloride salts are useful as plant growth regulating materials and particularly valuable as agents for stunting or retarding the growth of narrow and broad leafed plants such as weeds, lawn grasses, young tomato plants and flowering herbs and shrubs. The compounds are also valuable for retarding the regrowth of cotton following defoliation. In such use the new products are applied to the foliage and/or above ground portions of the plants in any suitable fashion. For example, the products may be dispersed in a finely divided solid and employed as dusts. Also such mixtures may be dispersed in water and the resulting compositions employed as sprays. In other procedures, the products may be dispersed in water or employed as constituents of oil compositions. Good results are obtained with compositions containing one percent or more by weight of the new products.

I claim:

1. A compound selected from the group consisting of (a) the lower-alkyl esters of ethionine and (b) the hydrogen chloride addition salts thereof.
2. Isopropyl ester of ethionine hydrochloride.
3. Normal butyl ester of ethionine hydrochloride.
4. Normal amyl ester of ethionine hydrochloride.
5. Normal hexyl ester of ethionine hydrochloride.
6. Normal hexyl ester of ethionine.

References Cited in the file of this patent

FOREIGN PATENTS 251,251     Switzerland _____ July 16, 1948